United States Patent [19]

So et al.

[11] Patent Number: 5,822,769
[45] Date of Patent: Oct. 13, 1998

[54] DUAL PORT RANDOM ACCESS MEMORY MATCHING CIRCUIT FOR VERSA MODULE EUROPE BUS (VMEBUS)

[75] Inventors: Woon-Seob So; Jin-Tae Kim, both of Daejeon, Rep. of Korea

[73] Assignees: Electronics and Telecommunications Research Institute, Daejeon; Korea Telecommunication Authority, Seoul, both of Rep. of Korea

[21] Appl. No.: 742,894

[22] Filed: Nov. 1, 1996

[30] Foreign Application Priority Data

Nov. 1, 1995 [KR] Rep. of Korea .................. 1995-39242

[51] Int. Cl.$^6$ ............................. G06F 13/00; G06F 12/00
[52] U.S. Cl. .......................... 711/149; 711/211; 395/306
[58] Field of Search .................................. 711/104, 105, 711/149, 211; 395/306, 307, 308

[56] References Cited

U.S. PATENT DOCUMENTS

| | | | |
|---|---|---|---|
| 5,307,475 | 4/1994 | Lau | 395/280 |
| 5,319,767 | 6/1994 | Lau | 395/280 |
| 5,414,814 | 5/1995 | McKim | 395/821 |
| 5,428,763 | 6/1995 | Lawler | 395/307 |
| 5,475,858 | 12/1995 | Gupta et al. | 395/800.29 |

*Primary Examiner*—Glenn Gossage
*Attorney, Agent, or Firm*—Antonelli, Terry, Stout & Kraus, LLP

[57] ABSTRACT

A dual port random access memory (RAM) matching circuit for a Versa Module Europe bus (VMEbus) which makes it possible to have a higher capacity when transmitting and receiving data by using a RAM which is possible to bidirectionally access during a communication between processors using a VMEbus of an electronic switching system. The dual port RAM matching circuit includes a dual port RAM for bidirectionally outputting/inputting a data in accordance with an address and a control signal, an address matching unit for selecting first through sixteenth addresses from a local system or first through sixteenth addresses from a VMEbus in accordance with the control signal, and a data matching unit for selecting 0-th through thirty first CPU data or 0-th through thirty first VMEbus data from the local system in accordance with the control signal from the control bus, and for checking a parity during a data transmission and receiving operation. The dual port RAM matching circuit further includes a control signal matching unit for selecting either the control signal from the local system or the control signal from the VMEbus in accordance with the control signal from the control bus and for outputting the selected control signal to the control bus, and a control signal generator for receiving an address information signal and a clock signal from the local system, and an address information signal from the VMEbus, and outputting control signals to the control bus.

7 Claims, 5 Drawing Sheets

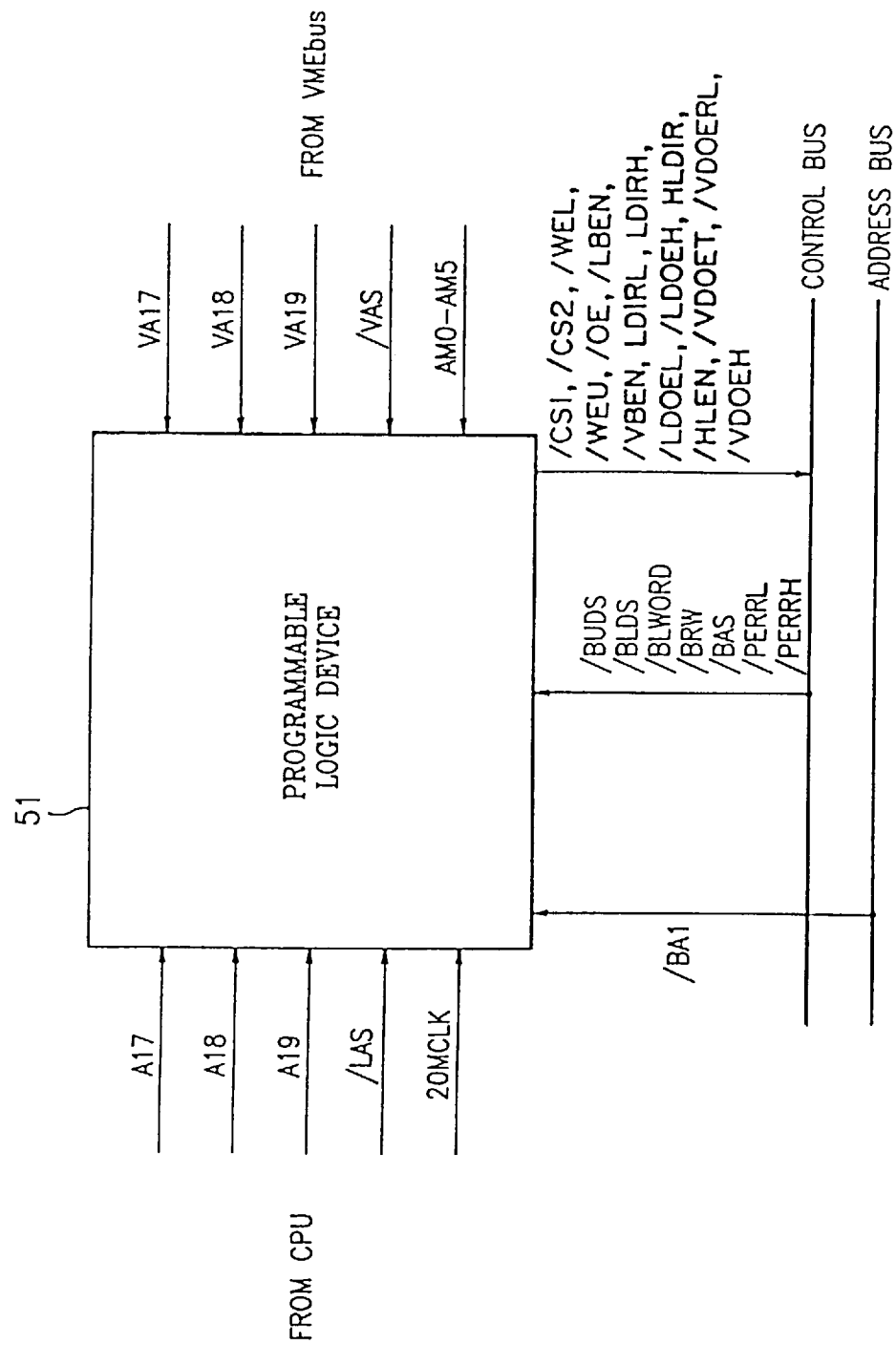

DUAL PORT RANDOM ACCESS MEMORY MATCHING CIRCUIT FOR VERSA MODULE EUROPE BUS (VMEBUS)

BACKGROUND OF THE INVENTION

1. Field of the Invention

The present invention relates to a dual port random access memory(RAM) matching circuit for a Versa Module Europe bus(VMEbus), and in particular to an improved dual port RAM memory matching circuit for a VMEbus which makes it possible to have a higher capacity by using a single port static RAM device having a higher capacity.

2. Description of the Conventional Art

Generally, since the dual port RAM matching circuit is directed to using a dual port RAM as a static RAM device for a Versa Module Europe bus (VMEbus) which is widely used as a backplane bus between processors, the capacity of the dual port RAM matching circuit is low. In order to fabricate the dual port RAM matching circuit having a higher capacity, a plurality of dual port RAMs are disadvantageously required. Here, the dual port RAMs need many devices, thus causing a very complicated construction of the components and increasing the fabrication cost.

SUMMARY OF THE INVENTION

Accordingly, it is an object of the present invention to provide a dual port RAM matching circuit for a VMEbus which overcomes the problems encountered in the conventional art.

It is another object of the present invention to provide an improved dual port RAM matching circuit for a VMEbus which makes it possible to have a higher capacity when transmitting and receiving data by using a RAM which is possible to bidirectionally access during a communication between processors using a VMEbus of an electronic switching system.

To achieve the above objects, there is provided an improved dual port RAM matching circuit for a VMEbus which includes a dual port RAM connected to a control bus, a data bus, and an address bus, respectively, for bidirectionally outputting/inputting data in accordance with an address and a control signal, an address matching unit for selecting first through sixteenth addresses from a local system or first through sixteenth addresses from a VMEbus in accordance with the control signal from the control bus, a data matching unit for selecting 0-th through thirty first CPU data from the local system or 0-th through thirty first VMEbus data from the VMEbus in accordance with the control signal from the control bus, for inputting/outputting the data to/from a data bus, checking a parity during a data transmission and receiving operation, and outputting an error signal, a control signal matching unit for selecting either the control signal from the local system or the control signal from the VMEbus in accordance with the control signal from the control bus and for outputting the selected control signal to the control bus, and a control signal generator for receiving the an address information signal and a clock signal from the local system and an address information signal from the VMEbus, generating control signals which are necessary for each circuit component, and outputting those signals to the control bus.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a block diagram illustrating the construction of a control signal generator of FIG. 1 according to the present invention.

DETAILED DESCRIPTION OF THE INVENTION

Figure 1:
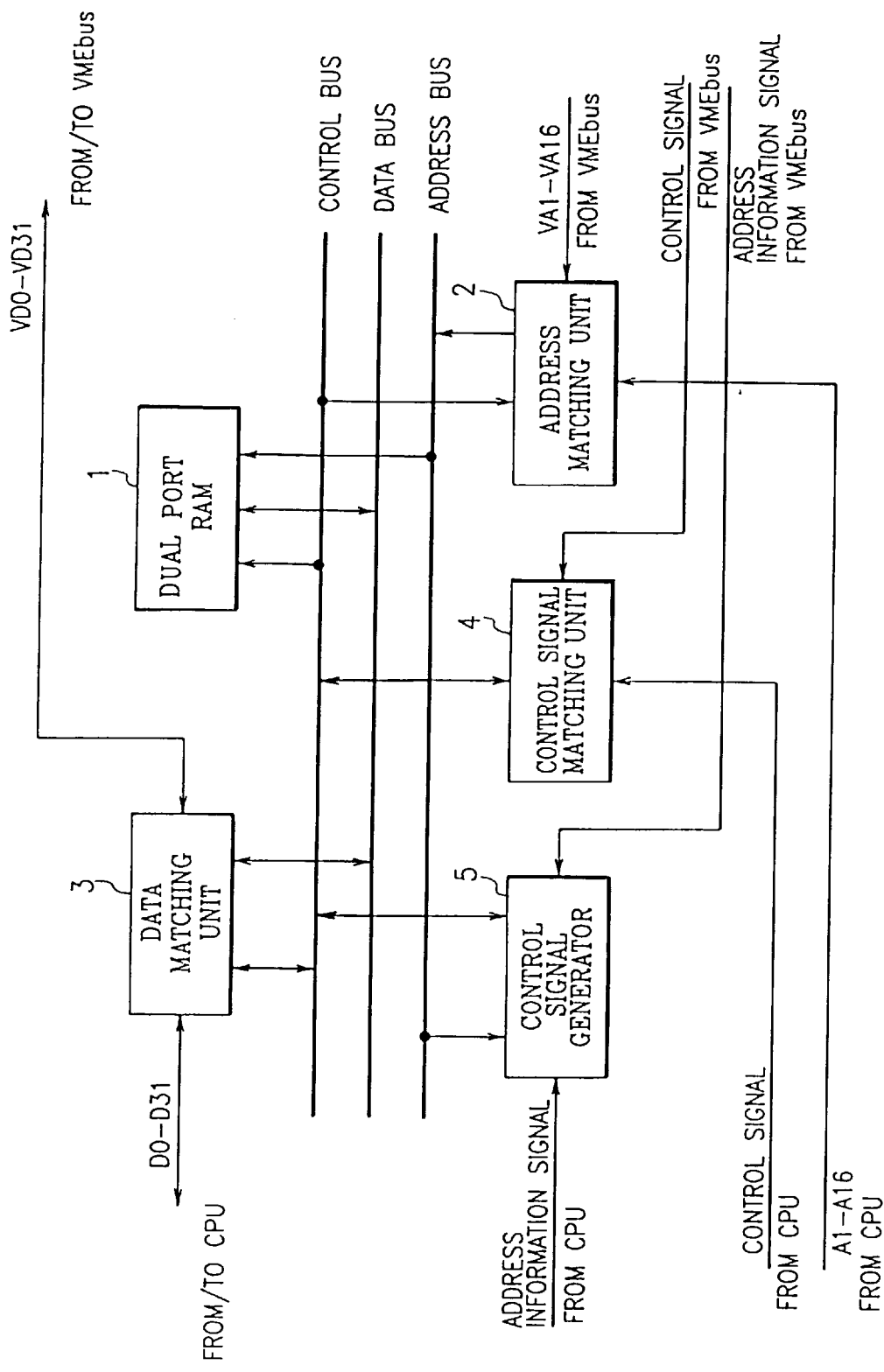
FIG. 1 is a block diagram illustrating a dual port RAM matching circuit for a VMEbus according to the present invention.

FIG. 1 is a block diagram illustrating a dual port RAM matching circuit for a VMEbus according to the present invention.

As shown therein, a dual port RAM 1 is connected to a control bus, a data bus, and an address bus, respectively, for bidirectionally outputting/inputting the data in accordance with the address signal from the address bus and the control signal from the control bus. An address matching unit 2 is connected to the control bus and the address bus, respectively, and is connected to a central processing unit (CPU) of a local system via address lines A1 through A16, and is connected to a VMEbus via address lines VA1 through VA16, so that either the address lines A1 through A16 of the local system or the address lines VA1 through VA16 of the VMEbus is selected in accordance with the control signal from the control bus and is outputted to the address bus.

The data matching unit 3 is connected to the CPU of the local system via data lines D0 through D31 of 32 bits, and is connected to the VMEbus via data lines VD0 through VD31 of 32 bits, and is connected to the control bus and the data bus, so that either the local system data or the VMEbus data is selected in accordance with the control signal from the control bus, and is inputted to the data bus, and the parity is checked during the data transmission and receiving, and parity error signals are outputted to the control bus.

The control signal matching unit 4 selects either the control signal outputted from the CPU of the local system or the control signal of the VMEbus in accordance with the control signal from the control bus and then outputs the selected control signal to the control bus, and the control signal generator 5 receives the address information signal and the clock signal outputted from the CPU of the local system and the address information signal from the VMEbus, and is connected to the control bus and the address bus, for thus generating the control signal which is necessary for each circuit component and outputting the signals to the control bus.

Figure 2:
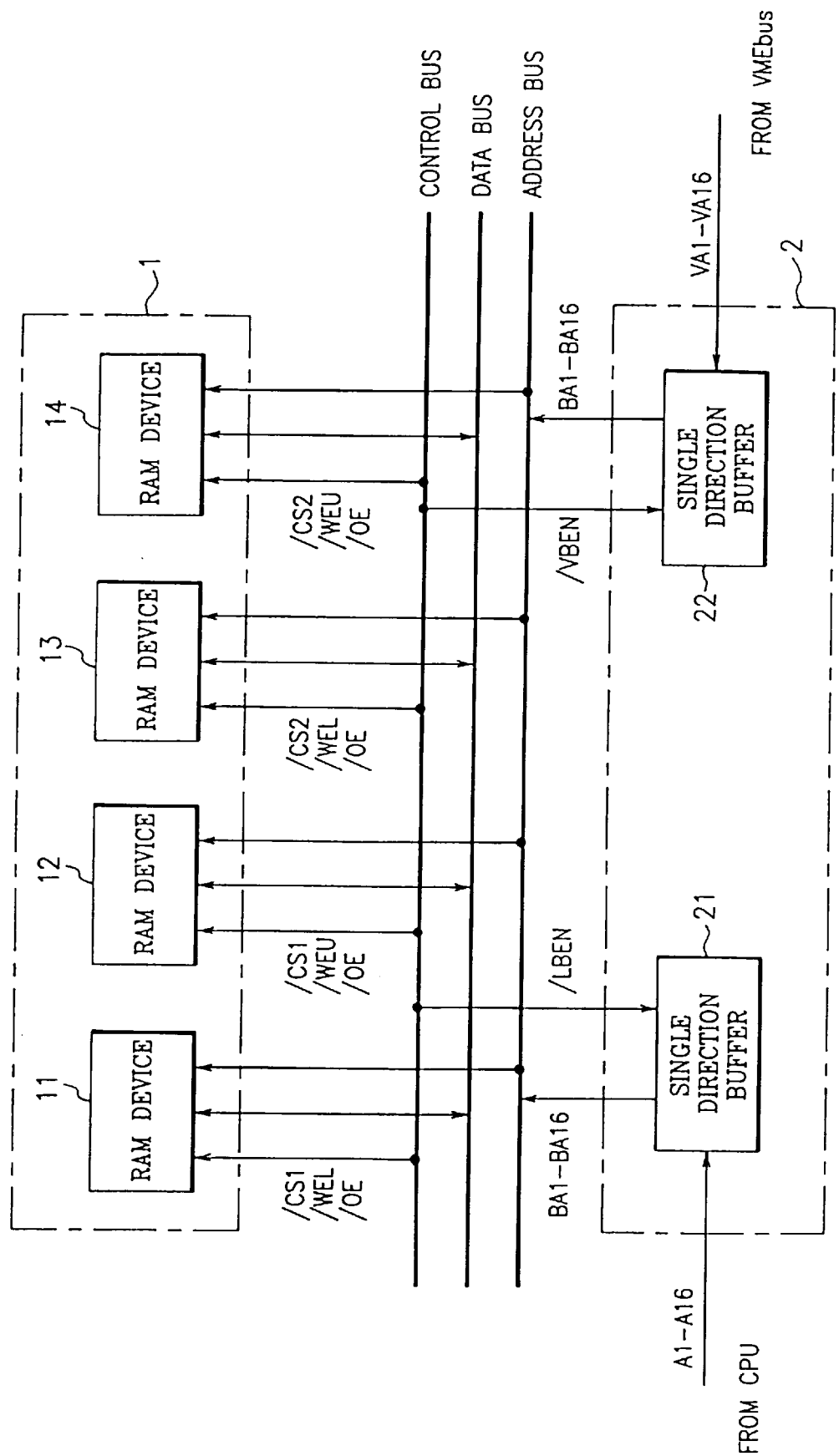
FIG. 2 is a block diagram illustrating the constructions of a dual port RAM and an address matching unit of FIG. 1.

FIG. 2 is a block diagram illustrating the constructions of a dual port RAM and an address matching unit of FIG. 1. As shown therein, reference numerals 11, 12, 13, and 14 denote single port static RAM devices of 8 bits, and 21 and 22 denote a single directional buffer of 16 bits.

As shown therein, the dual port RAM 1 includes four single port static RAM devices 11, 12, 13, and 14, and each of the RAM devices 11 through 14 is 8 bits. The address line is inputted from the address bus of 15 bits A0 through A14. Here, it is possible to increase the capacity by using the RAM device having a higher capacity. The entire data is formed of 32 bits, for thus forming a long word, because each of the RAM devices 11 through 14 is operated in 8 bits mode each, and is recognized by the control signals from the control bus.

The first RAM device 11 receives a chip selection signal /CS1, and a write signal /WEL from the control bus, and is connected to the data bus with the data lines BD0 through BD7. The second RAM device 12 receives a chip selection signal /CS1, and a write signal /WEU from the control bus and is connected to the data bus with the data lines BD8 through BD15. The third RAM device 13 receives a chip selection signal /CS2 and a write signal /WEL from the control bus, and is connected with the data lines BD16 through BD23. The fourth RAM device 14 receives a chip selection signal /CS2 and a write signal /WEU from the control bus, and is connected to the data bus with the data lines BD24 through BD31.

In addition, each of the RAM devices 11 through 14 receives an output signal /OE from the control bus, and is connected with the address lines BA2 through BA16 from the address bus for performing a data read and write operation of a word and a long word by byte unit, and the signals /CS1, /CS2, /WEL, /WEU, and /OE are inputted from the control bus, and the lines BD0 through BD31 are connected with the data bus.

The address matching unit 2 includes unidirectional buffers 21 and 22 of 16 bits. The first unidirectional buffer 21 is connected with the address lines A1 through A16 of 16 bits and the address buses BA1 through BA16 of 16 bits extended from the CPU and is controlled in accordance with the local system enable signal /LBEN from the control bus, and the second unidirectional buffer 22 is connected with the address lines VA1 through VA16 and the address buses BA1 through BA16 of 16 bits extended from the VMEbus and is controlled in accordance with the VMEbus enable signal /VBEN from the control bus.

Namely, when the local system enable signal /LBEN is low level, the signals A1 through A16 of the CPU is carried on the address bus as the signals BA1 through BA16, and when the VMEbus enable signal /VBEN is low level, the signals VA1 through VA16 of the VMEbus are carried on the address bus as the signals BA1 through BA16.

Figure 3:
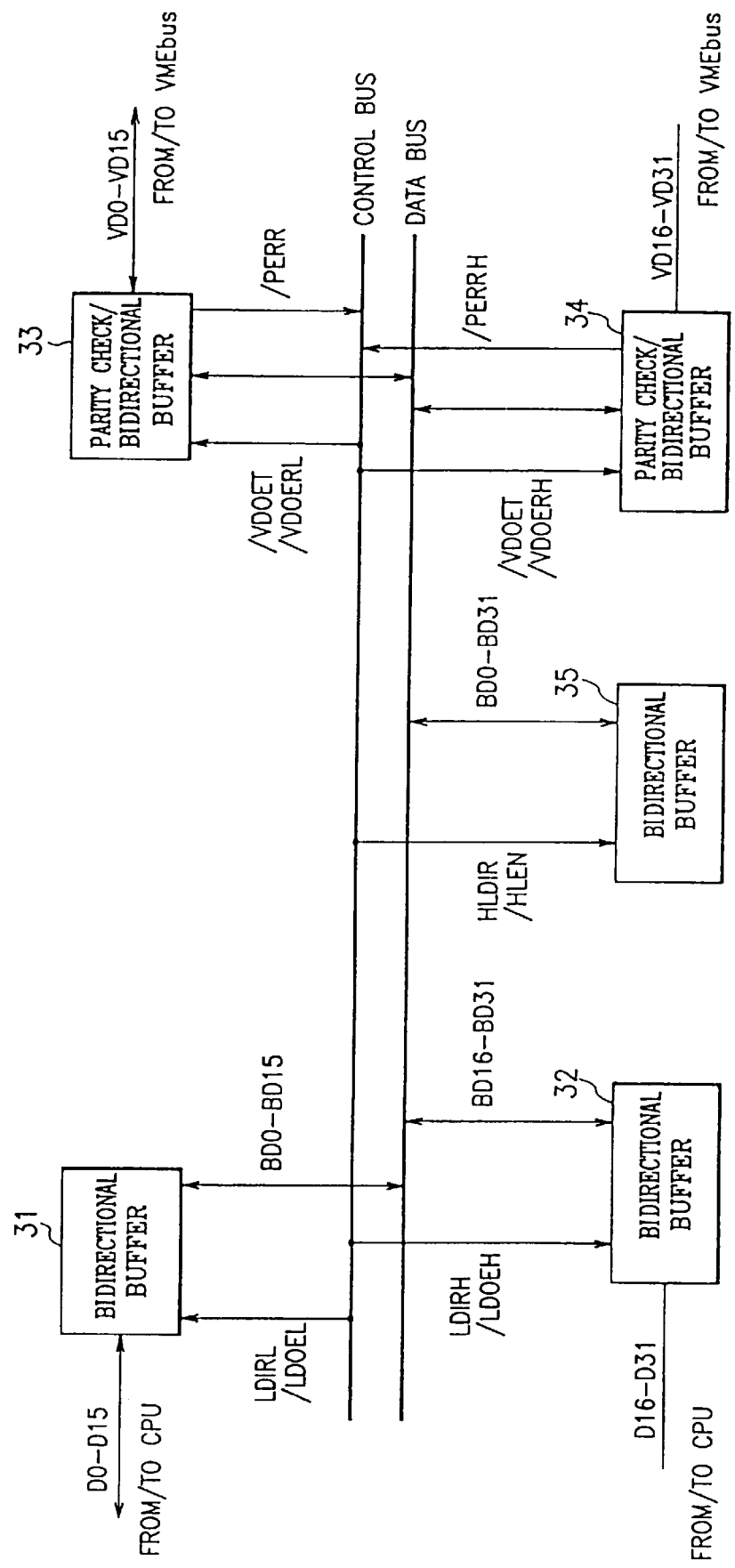
FIG. 3 is a block diagram illustrating the construction of a data matching unit of FIG. 1 according to the present invention.

FIG. 3 is a block diagram illustrating the construction of a data matching unit of FIG. 1 according to the present invention.

As shown therein, a bidirectional buffer 31 is connected with lower data lines D0 through D15, a control bus, and data bus, respectively. A bidirectional buffer 32 is connected with upper data lines D16 through D31 of the CPU, the control bus and the data bus. A parity check/bidirectional buffer 33 is connected with lower data lines VD0 through VD15 of the VMEbus, the control bus, and the data bus and has a parity checking function. A parity check/bidirectional buffer 34 is connected with upper data lines VD16 through VD31 of the VMEbus, the control bus, and the data bus and has a parity checking function. A bidirectional buffer 35 is connected for converting the lower data BD0 through BD15 to the upper data BD16 through BD31, when the signal HLDIR is high level and the signed /HLEN is low level.

In addition, the first bidirectional buffer 31 controls the 16-bit data lines D0 through D15 from the CPU and the 16-bit data lines BD0 through BD15 of the data bus in accordance with the signal LDIRL and the signal /LDOEL from the control bus, and the second bidirectional buffer 32 controls the 16-bit data lines D16 through D31 from the CPU and the 16-bit data lines BD16 through BD31 of the data bus in accordance with the signal LDIRH and the signal /LDOEH from the control bus, and the third bidirectional buffer 35 controls the lower 16-bit data lines BD0 through BD15 and the upper 16-bit data lines BD16 through BD31 from the data bus in accordance with the signal HLDIR and the signal /HLEN from the control bus.

In addition, the first parity check/bidirectional buffer 33 having the parity checking function controls the lower data lines VD0 through VD15 of the VMEbus and the 16-bit data lines BD0 through BD15 of the data bus in accordance with the signal /VDOET and the signal /VDOERL, and the second parity check/bidirectional buffer 34 having the parity checking function controls the upper data lines VD16 through VD31 of the VMEbus and the 16-bit data lines BD16 through BD31 of the data bus in accordance with the signal /VDOET and the signal /VDOERH.

Namely, when the signal LDIRL is high level, and the signal /LDOEL is low level, the signals D0 through D15 from the CPU are carried on the data bus as the signals BD0 through BD15, and when the signal LDIRL is low level, and the signal /LDOEL is low level, the signals BD0 through BD15 from the data bus are carried on the CPU as the signals D0 through D15 the When the signal LDIRH is high level, and the signal /LDOEH is low level, the signals D16 through D31 from the CPU are carried on the data bus as the signals BD16 through BD31. When the signal LDIRH is low level and the signal /LDOEH is low level, the signals BD16 through BD31 from the data bus are carried on the CPU as the signals D16 through D31.

When the signal /VDOET is low level, the signals BDO through BD31 from the data bus are carried on the VMEbus as the signals VD0 through VD31, and when the signal /VDOERL is low level, the signals VD0 through VD15 from the VMEbus is carried on the data bus as the signals BD0 through BD15. When the signal /VDOERH is low level, the signals VD16 through VD31 from the VMEbus is carried on the data bus as the signals BD16 through BD31 of the data bus, and when a parity error occurs during the data transmission and receiving operation, the error indication signals PERRL and /PERRT becomes low level and is carried on the control bus.

When the signal HLDIR is high level and the signal /HLEN is low level, the signals BD16 through D31 from the data bus are carried on the data bus as the signals BD0 through BD15, and when the signal HLDIR is low level and the signal /HLEN is low level, the signals BD0 through BD15 from the data bus are carried on the data bus as the signals BD16 through BD31.

Figure 4:
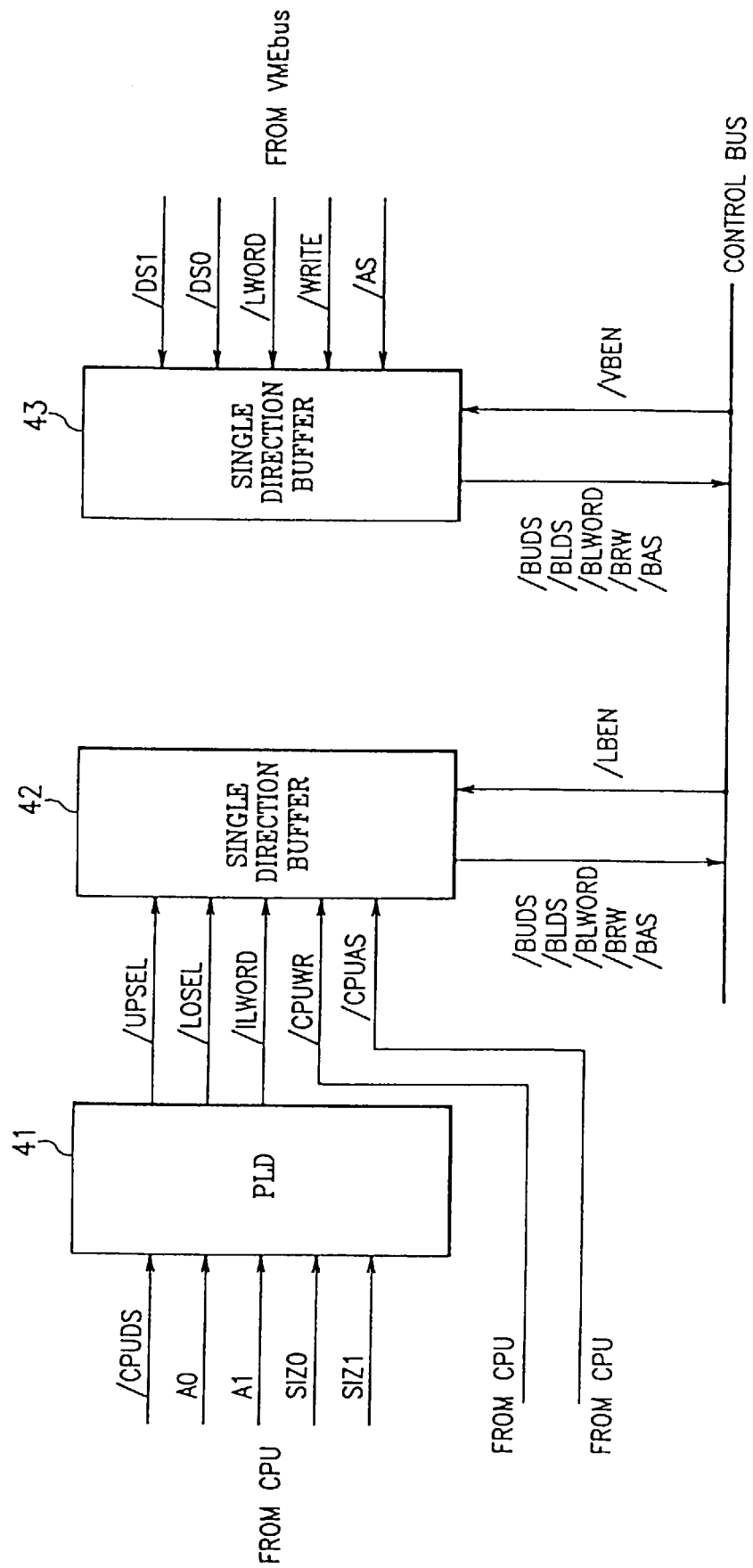
FIG. 4 is a block diagram illustrating the construction of a control signal matching unit of FIG. 1 according to the present invention.

FIG. 4 is a block diagram illustrating the construction of a control signal matching unit of FIG. 1 according to the present invention.

As shown therein, there are provided a programmable logic device (PLD) 41 for combining and outputting the input signals from the CPU, and 8-bit unidirectional buffers 42 and 43 for buffering the control signal.

The programmable logic device 41 receives a data strobe signal /CPUDS, address signals A0 and A1, and data size signals SIZ0 and SIZ1 from the CPU and outputs an upper byte effective signal /UPSEL, a lower byte effective signal /LOSEL, and a long word effective signal /ILWORD to the unidirectional buffer 42.

The first unidirectional buffer 42 receives the signals /UPSEL, /LOSEL, and /ILWORD from the programmable logic device 41, and also receives the write signal /CPUWR and the address effective signal /CPUAS from the CPU. When the local system enable signal /LBEN is low level, the signals /BUDS, /BLDS, /BLWORD, /BRW, and /BAS are outputted to the control bus. The second unidirectional buffer 43 receives the signal /DS0, /DS1, /LWORD, /WRITE, and /AS from the VMEbus, and when the VMEbus enable signal /VBEN is low level, the second unidirectional buffer 43 outputs the signals /BUDS, /BLDS, /BLWORD, /BRW, and /BAS to the control bus.

FIG. 5 is a block diagram illustrating the construction of a control signal generator of FIG. 1 according to the present invention.

As shown therein, the programmable logic device 51 receives the address information signals A17, A18, A19, and /CPUAS and the clock signal 20MCLK from the CPU and receives the address information signals VA17, VA18, VA19, /VAS, AM5, AM4, AM3, AM2, AM1, and AM0 from the VMEbus, and receives the signals /BUDS, /BLDS, /BLWORD, /BRW, /BAS, /PERRL, and PERRH from the control bus. The PLD51 also receives the signal /BA1 from the address bus. Thereafter, the programmable logic device 51 combines the thusly received signals, the control signals /CS1, /CS2, /WEL, /WEU, /OE, /LBEN, /VBEN, LDIRL, LDIRH, /LDOEL, /LDOEH, HLDIR, /HLEN, /VDOET, /VDOERL, AND /VDOERH, and those signals are outputted to the control bus.

As described above, the dual port RAM matching circuit for a VMEbus according to the present invention is directed to forming the dual port RAM based on the size of the single port static RAM which is used for the dual RAM matching circuit in the communication between processors using the VMEbus in an electronic switching system. The dual port RAM matching circuit for the VMEbus is formed of 32 bits, and various accesses are available including a word and a long word by byte unit. In addition, since various control signals are generated by the signal combination using the programmable logic device, it is possible to achieve various applications using the same programmable logic device.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A dual port random access memory (RAM) matching circuit for a Versa Module Europe bus (VMEbus), comprising:

a dual port RAM connected to a control bus, a data bus, and an address bus, respectively, for bidirectionally outputting/inputting data in accordance with an address and a control signal;

an address matching unit for selecting first through sixteenth addresses from a local system or first through sixteenth addresses from a VMEbus in accordance with the control signal from the control bus;

a data matching unit for selecting 0-th through thirty first CPU data from the local system or 0-th through thirty first VMEbus data from the local system in accordance with the control signal from the control bus, for inputting/outputting the selected data signal to/from the data bus, checking parity during a data transmission and receiving operation, and outputting error signals;

a control signal matching unit for selecting either the control signal from the local system CPU bus or the control signal from the VMEbus in accordance with the control signal from the control bus and for outputting the selected control signal to the control bus; and a control signal generator for receiving an address information signal and a clock signal from the local system and an address information signal from the VMEbus, generating control signals which are necessary for each circuit component, and outputting those signals to the control bus.

2. The circuit of claim 1, wherein said dual port RAM includes first through fourth single port static RAM devices for reading and writing a data in accordance with a chip selection signal, a write signal, and an output enable signal from the control bus and an address from the address bus.

3. The circuit of claim 2, wherein said first to fourth static RAM devices read and write data of a word or a long word by byte unit.

4. The circuit of claim 1, wherein said address matching unit includes:

a first unidirectional buffer for transmitting first through sixteenth addresses from the local system to the address bus when a local system enable signal from the control bus is activated; and a second unidirectional bus for transmitting first through sixteenth addresses from the VMEbus to the address bus when a VMEbus enable signal from the control bus is activated.

5. The circuit of claim 1, wherein said data matching unit includes:

a first bidirectional buffer for transmitting 0-th through fifteenth lower data from the local system to the data bus in accordance with signals from the control bus and for transmitting a lower data from the data bus to the local system;

a second bidirectional buffer for transmitting sixteenth through thirty first upper data from the local system to the data bus in accordance with signals from the control bus and for transmitting an upper data form the data bus to the local system;

first and second parity check/bidirectional buffers for transmitting data from the data bus to the VMEbus in accordance with signals from the control bus, transmitting the data from the VMEbus to the data bus, and transmitting an error generation signal to the control bus when a parity error is generated during a data transmission and receiving operation; and a third bidirectional buffer for converting the upper and lower data from the data bus in accordance with signals from the control bus.

6. The circuit of claim 4, wherein said control signal matching unit includes:

a first programmable logic device for receiving a data strobe signal, an address signal, and a data size signal from the local system and for outputting an upper byte effective signal, a lower byte effective signal, and a long word effective signal;

a third unidirectional buffer for receiving the output from the first programmable logic device and a write signal and an address signal from the local system when the local system enable signal from the control bus is activated and for outputting control signals to the control bus; and a fourth unidirectional buffer for receiving signals from the VMEbus when the VMEbus enable signal from the control bus is activated and for outputting control signals to the control bus.

7. The circuit of claim 5, wherein said control signal generator includes a second programmable logic device for receiving an address information signal and a clock signal from the local system, receiving address information from the VMEbus, receiving the error generation signal and control signals from the control bus, generating control signals, and outputting those signals to the control bus.

\* \* \* \* \*